(12) United States Patent
Hocaoglu et al.

(10) Patent No.: US 6,249,714 B1
(45) Date of Patent: Jun. 19, 2001

(54) VIRTUAL DESIGN MODULE

(75) Inventors: Cem Hocaoglu, Port Jefferson Station, NY (US); Robert J. Graves, Pelham; Arthur C. Sanderson, Williamstown, both of MA (US); Raj Subbu, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 09/224,582

(22) Filed: Dec. 31, 1998

(51) Int. Cl.$^7$ ................................. G06F 19/00
(52) U.S. Cl. ........................ 700/97; 700/96; 700/95; 700/28; 700/36; 700/48; 706/13; 707/1; 707/3; 707/4; 707/5; 707/10
(58) Field of Search ................. 700/96, 97, 98, 700/48–50, 28, 36; 706/13; 707/1, 3–4, 5, 10

(56) References Cited

U.S. PATENT DOCUMENTS

| | | | |
|---|---|---|---|
| 5,689,711 | * 11/1997 | Bardsaz et al. | 717/1 |
| 5,754,738 | * 5/1998 | Saucedo et al. | 706/11 |
| 5,903,902 | * 5/1999 | Orr et al. | 707/517 |
| 6,085,238 | * 7/2000 | Yuasa et al. | 709/223 |
| 6,108,662 | * 8/2000 | Hoskins et al. | 707/102 |

\* cited by examiner

*Primary Examiner*—William Grant
*Assistant Examiner*—Ramesh Patel
(74) *Attorney, Agent, or Firm*—Notaro & Michalos P.C.

(57) ABSTRACT

A Virtual Design Module (VDM) used in a networked design environment generates manufactured product designs that are near optimal in terms of cost and production cycle time by using design data files containing alternative parts and manufacturers information. Numerous product design alternatives are considered and evaluated in terms of design-manufacturing-parts-supplier feasibility and real-time information on cost and production cycle time for realization. The VDM generates a population of new designs with appropriate board design information to allow for design-manufacturer-supplier decision making and determines the feasibility of each member of the current generation of designs and rejects designs that are not feasible. The VDM triggers Mobile Software Agents (MSA) that obtain data for parts availability, cost, lead time and manufacturer data for manufacturing availability, cost and lead time for each feasible member of the current generation of designs and return the data. In one application for printed circuit board design, the VDM evaluates each member of the current generation of designs by calculating cost, lead-time and value using a J function. The VDM then improves board designs through selection and use of board design modifiers. The process continues until optimized designs are obtained. Optimized board designs are output as results to an operator.

7 Claims, 7 Drawing Sheets

VIRTUAL DESIGN MODULE

STATEMENT AS TO RIGHTS TO INVENTIONS MADE UNDER FEDERALLY SPONSORED RESEARCH AND DEVELOPMENT

This invention was developed pursuant to Federally Sponsored Research Project Number (NSF Cooperative Agreement) DMI-9320955 [and the United States government may have rights in this invention].

FIELD AND BACKGROUND OF THE INVENTION

The present invention relates generally to the field of industrial design evolution and optimization and in particular to a new and useful method for designing optimized industrial products, such as printed circuit boards, incorporating nearly real-time design-manufacturer-supplier decision making.

Previous work at the Electronics Agile Manufacturing Research Institute (EAMRI) at Rensselaer Polytechnic Institute has recognized the critical role which information infrastructure plays in the design and manufacturing organizations.

The necessity to overcome information barriers between companies working together is discussed, for example, in an article written by Michael W. Sobolewski and Joseph W. Erkes, "CAMnet: Architecture and Applications" found in *Proceedings of Concurrent Engineering 1995 Conference*, pages 627–634, McLean, Va., August 1995. The Sobolewski et al. article describes research activities in the areas of architecture and functionality for the Computer-Aided Manufacturing (CAMnet) project. The goal of the CAMnet project is to develop and demonstrate enablers for delivering manufacturing services across virtual enterprises. Virtual enterprises or partnerships are formed by companies having complimentary capabilities who are able to join together to exploit market opportunities. Virtual enterprises require information technology, such as computers and Internet to overcome distance and time barriers to allow coordination and cooperation.

The EAMRI work has focused on electronics products for both commercial and defense applications. The objective of the work is to improve productivity and response time through improvements in information infrastructure. In this work, the improvement in manufacturing activity is achieved by shortening the response time of individual entities and by selecting alternative strategies to maximize responsiveness of the global enterprise. Based on the current state of the art, manual transfer of data between systems and manual analysis are the only viable alternatives.

Of particular interest to the EAMRI, the detailed design of printed circuit board assemblies (PCBA) consumes a large portion of the time required to bring a new product to market and is therefore a focus of its information infrastructure work. This phase of the design effort that we identify as the "detailed design phase" uses the circuit design schematics as an input and concludes with an approved design ready for manufacturing implementation. During this detailed design phase, the PCBA designer makes decisions about component selection and the physical design of the printed circuit board layers and connection points. This resulting physical design should match the performance characteristics of the schematic design used as a beginning for this design phase.

A class of support technologies used by the PCBA designer is known as CAD, or Computer-Aided Design tools. CAD tools make use of component libraries containing data on the electrical and physical attributes of the possible components to be incorporated in the design. CAD tools, however, do not provide the designer with information about the price or the availability of components. In current practice, therefore, critical design decisions about the PCBA do not benefit from this information.

Additional information items, such as, component price, component availability, and manufacturing capacity availability at supply sites, among others, are highly variable and time dependent. These information items are also critically important to the detailed design phase so as to result in PCBA designs that can be manufactured within cost and cycle time objectives.

Without this important information, current PCBA designs often cost more and take longer to get into the marketplace than is necessary. This has led to major interest in U.S. electronics companies to find ways to reduce cost and cycle time.

A technology is needed 1) to capture price, availability and manufacturing capacity information from the potential suppliers of material and manufacturing services (e.g., fabrication or assembly/test); 2) to take advantage of the near real-time nature of the information in terms of its accuracy; and 3) to present the information for use by designers in the detailed design phase for PCBAs. Since the PCBA designer must often choose from among many options for electronic components, many different suppliers of component parts, and various manufacturing technologies (e.g. pin through-hole or surface mount) representing their PCBA design, a fourth attribute of the needed technology is that it is an automated system.

Presently, there are no commercial systems with features and functions targeted to address these problems with PCBA design. Further, the inventors are not aware of any known automated systems that have these features and functions either.

John Koza et. al. in "Automated Synthesis of Analog Electrical Circuits by Means of Genetic Programming", *IEEE Transactions on Evolutionary Computation*, Vol. 1, No. 2, pp. 109–128, 1997, describe an automated process utilizing genetic programming for designing both the topology and the sizing of the components of an electrical circuit. As described in the article, the goal of their work is to automatically design an electrical circuit which satisfies a set of user-specified design goals. In order to apply genetic programming to circuit synthesis, a mapping has been established between point-labeled trees in genetic programming and line-labeled cyclic graphs used in electrical circuits. A simple embryonic circuit is used for building a more complex circuit by evolving circuits using component-creating and connection-modifying functions. The number of input signals and the number of output signals of an electrical circuit determines the embryonic circuit used in a particular problem. The algorithm has been applied to a number of circuit synthesis problems, one of which was the design of an asymmetric bandpass filter. Koza et al. demonstrate that automatic synthesis of electrical circuits through genetic evolution can be competitive with human performance. However, Koza et al. still lack the incorporating real-time, or nearly real-time data into the design process and optimization of the design for cost and manufacturing efficiency, as well as product function efficiency.

Articles of interest generally describing a system for incorporating many different design features include Sanderson et al., "Multipath Agility in Electronics Manufacturing", *IEEE International Conference on Systems, Man and Cybernetics*, 1994. Sanderson et al. describe theoretical systems being explored by EAMRI to develop an agile manufacturing system.

In Hocaoglu et al., "Implementation and Assessment of a Distributed, Object-Oriented Information Infrastructure for Agile Electronics Manufacturing", *Proceedings of the third ISPE International Conference on Concurrent Engineering*, Toronto, Ontario, Canada, August 1996, the authors generally describe a wide area network (WAN) for transferring data between different groups of suppliers, manufacturers, designers and customers in an agile manufacturing system. Specific connections and interrelations between the different components of the supplier-manufacturer system are not described.

Another general description of an integrated design-supplier-manufacturer agile manufacturing system is found in Hocaoglu et al., "Meeting Today's Design Challenges With Agile Manufacturing", *Printed Circuit Design*, pages 34–36, September 1997. The article notes in particular that a method for communication between a virtual design environment and distributed knowledge databases to permit linking of the information was being developed.

Other articles of note include R. J. Graves, Arthur C. Sanderson, Cem Hocaoglu and R. Subbu, "Electronics Agile Manufacturing Research Institute: Information Infrastructure Research and Demonstration." *The* 1998 *NSF Design and Manufacturing Grantees Conference*, Jan. 5–8, 1998, Monterey, Mexico; Mizoguchi et al. "Production Genetic Algorithms for Automated Hardware Design Through an Evolutionary Process", *Proceedings of the* 1994 *IEEE International Conference on Evolutionary Computation*, pp. 661–664, April 1994; John R. Koza, F. H. Bennett III, D. Andre :M. A. Keane and F. Dunlap, "Automated Synthesis of Analog Electrical Circuits by Means of Genetic Programming", *IEEE Transactions on Evolutionary Computation*, Vol. 1, No. 2, pp. 109–128, 1997; and M. S. Fox and S. F. Smith, "ISIS—a knowledge-based system for factory scheduling", *Expert Systems*, Vol. 1, No. 1, pp. 25–49, 1984. Patents which disclose design optimization or evolution methods and apparatus include U.S. Pat. Nos. 5,148,513, 5,598,566, 5,615,124, 5,761,381 and 5,764,953.

SUMMARY OF THE INVENTION

It is an object of the present invention to provide an integrated design-manufacturing-supplier virtual design module which can create new designs and optimize designs for cost, build time and product operational efficiency using near real-time information.

Accordingly, a virtual design module of the invention offers a new approach to assessing designs for printed circuit board designs and other manufactured products. The virtual design module uses near real-time information of supplier and manufacturer costs and availability in conjunction with evolutionary design tools to optimize product designs, and in particular, printed circuit board designs, for cost, production time and product operational efficiency. A computer network system of mobile software agents retrieve information and process requests from evolutionary intelligent agents to provide near real-time information used in creating a population of virtual designs of the product. Each design is evaluated by the evolutionary intelligent agent and then new designs are generated based on the previous designs created by the evolutionary intelligent agent in conjunction with design modifiers.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
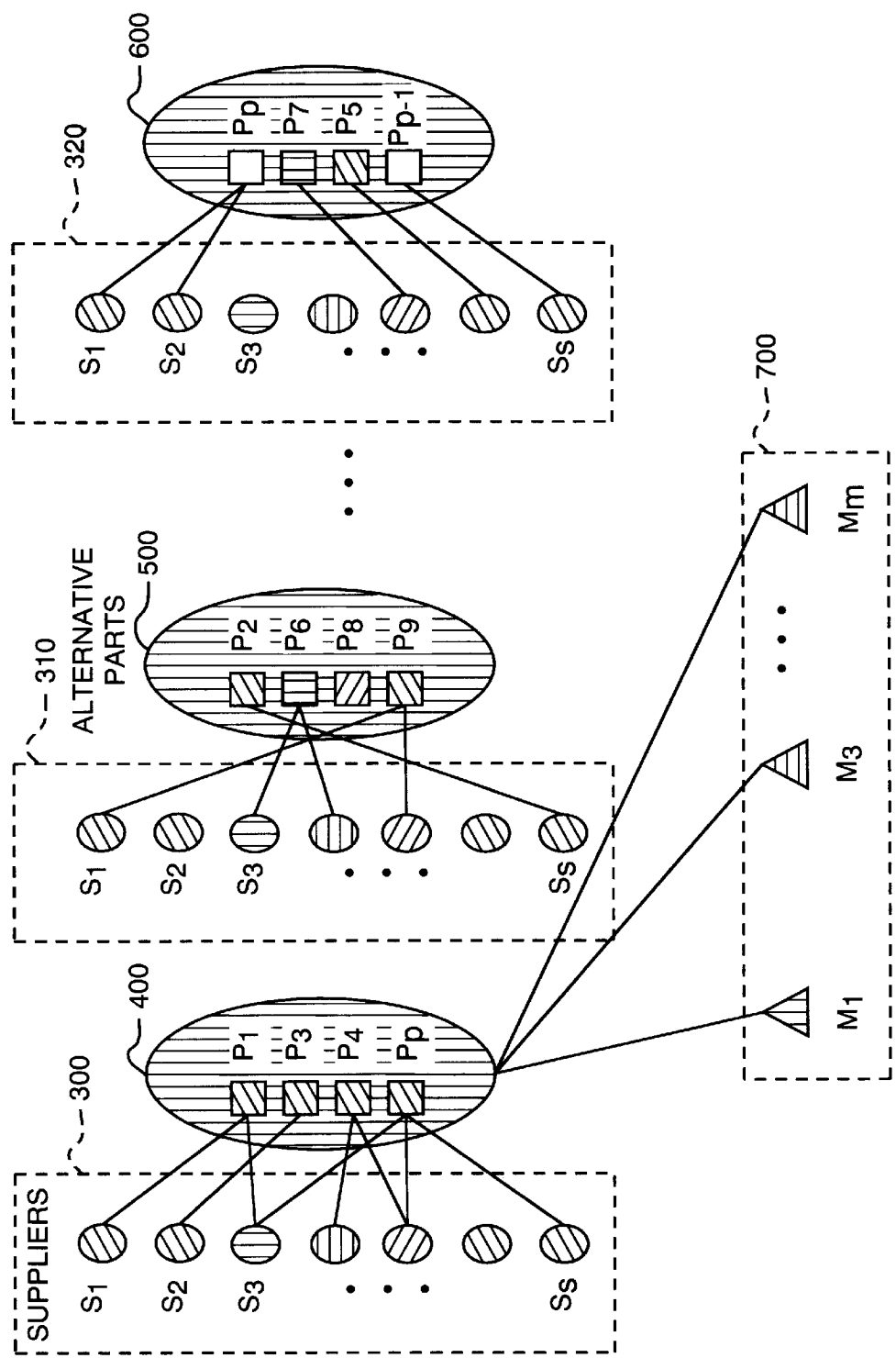
FIG. 1 is a block diagram showing the interrelation of sets of suppliers, manufacturers and parts used to make a product.

Referring now to the drawings, in which like reference numerals are used to refer to the same or similar elements, FIG. 1 shows a diagram of the interrelation between suppliers 300, 310, 320 and parts 400, 500, 600 and manufacturers 700 which the virtual design module of the invention uses to optimize a product design and its manufacture. Typically, multiple suppliers $S_1$–$S_s$ in each group of suppliers 300, 310, 320 will sell the same parts or substitute parts 400, 500, 600 at different prices. Supplier groups 300, 310, 320 may consist of the same selected suppliers $S_1$–$S_s$, or they may be different. Parts in 400, 500 are assembled into products, e.g. PCBA, each by one by or more of manufacturers $M_1$–$M_m$ 700. Parts in 400, 500, and, 600 are simply alternative selections having the same function. Each manufacturer $M_1$–$M_m$ typically has different production times and delivery times for each assembly they make. Thus, a complex array of usable parts 400, 500, 600, suppliers 300, 310, 320, manufacturers 700, prices and delivery time information is presented. The information array may include additional items as well, such as tolerances and other quality measurements.

Figure 2:
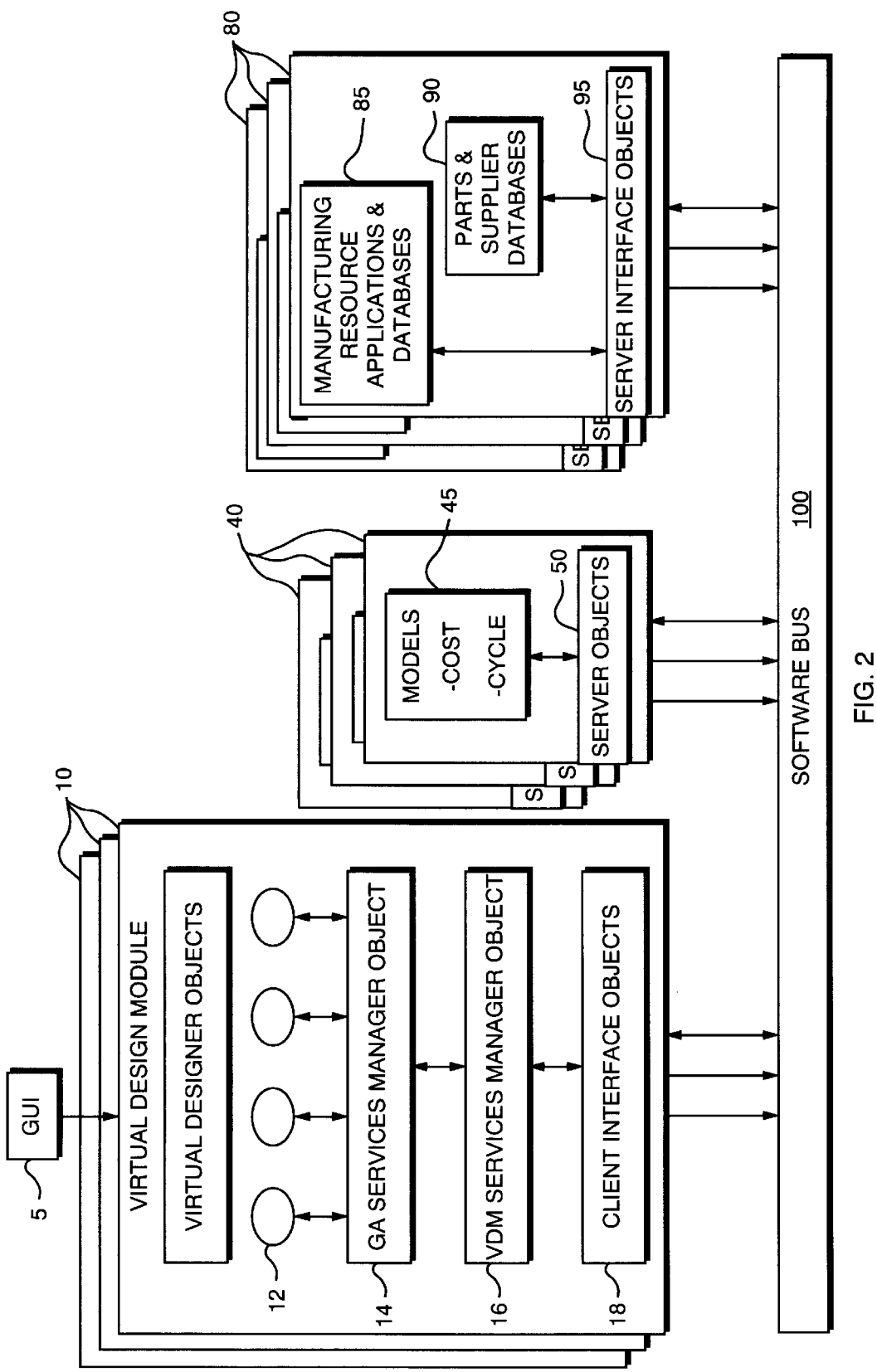
FIG. 2 is a block diagram of the general architecture of the virtual design module system.

In FIG. 2, a diagram of the environment in which the virtual design module 10 operates, is shown. A software bus 100, which may be internet, intranet or extranet connects one or more virtual design modules 10 to supplier model objects 40 and relevant manufacturer and parts and supplier database objects 80 for the particular products being designed. Each of the modules 10, supplier model objects 40 and supplier database objects 80 is run on a computer connected by a bi-directional communications path to the software bus 100.

One suitable software bus is known as CORBA (Common Object Request Broker Architecture). The CORBA specification supports a heterogeneous object-oriented distributed computing environment, and is a product of a consortium known as the Object Management Group (OMG). CORBA allows intelligent software components to function on a highly modular software bus. CORBA also specifies an extensive set of bus-specific services for accessing, creating and defining relationships between objects.

Returning to FIG. 2, the virtual design module 10 is software running on a computer with a graphical user interface (GUI) 5 for displaying the operations, commands and results of the design process. Any type of computer, such as IBM-compatible personal computers, Apple Macintosh computers, Sun Sparc workstations, UNIX systems and others capable of operating the GUI 5 and connecting to the software bus 100 may be used.

The supplier model objects 40 connected to the software bus 100 have models 45 which contain cost and production cycle time expressions and algorithms. The models 45 are accessible over the software bus 100 via server objects 50, which control the requests and queries from the virtual design modules 10.

The supplier database objects 80 contain both manufacturer databases 85 and parts & supplier databases 90 having information relating to pricing, availability, etc. This information is also available to the virtual design modules 10 over the software bus 100, with access controlled at the supplier database objects 80 by server interface objects 95.

The virtual design module 10 includes one or more virtual design objects 12 in combination with a genetic algorithm (GA) services manager object 14, a virtual design module (VDM) services manager object 16 and client interface objects 18. The client interface objects 18 are responsible for establishing reliable connections with the supplier model objects 40 and supplier database objects 80 over the software bus 100. Once a connection is established, the client interface objects 18 transfer control to the VDM services manager object 16 to handle requests from the virtual design module objects 12. The GA services manager object 14 implements a genetic algorithm and is used to maintain and manage a population of product design alternatives, as well as for compiling and reporting performance statistics to a user of the virtual design module 10 via the GUI 5. The genetic algorithm is programmed with the desired characteristics which should be optimized by the virtual design module 10.

Figure 3:
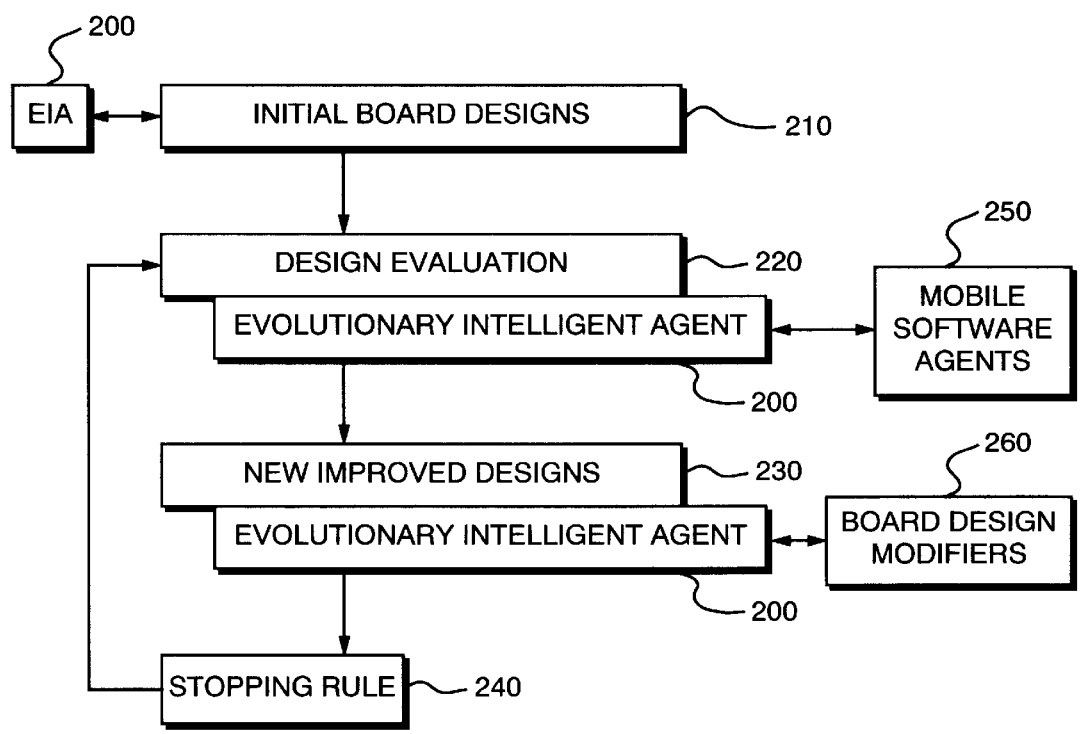
FIG. 3 is a flow chart showing the processing steps used by the virtual design module.

Evolutionary intelligent agents (EIA) 200 are used by the virtual design objects 12 with the GA services manager object 14 to initialize, optimize, and generate product designs. FIG. 3 shows the processing steps taken by the virtual design module 10 to perform these functions, such as for a printed circuit board design.

The EIA 200 generates initial board designs 210, which are then evaluated 220 according to a genetic algorithm for optimizing particular features of the board design on a weighted basis. During the design evaluation 220, the EIA 200 generates queries for mobile software agents 250 to execute. The MSA 250 searches across the software bus 100 for information relevant to the query contained in the supplier model objects 40 and supplier database objects 80 and reports the results to the EIA 200. The query results are then used in the design evaluation 220 to obtain near real-time results for the particular product being designed.

Based on the results of the design evaluation 220, the genetic algorithm is used to generate new designs 230. The EIA 200 then determines the feasibility of the designs and works with board design modifiers 260 to further evolve the new designs for further evaluation 220 if a predetermined stopping rule 240 is not satisfied.

This evolutionary design process shown in FIG. 3 can be repeated multitudes of times to generate optimized product designs in a short period of time using information which is as accurate as possible.

Figure 4A:
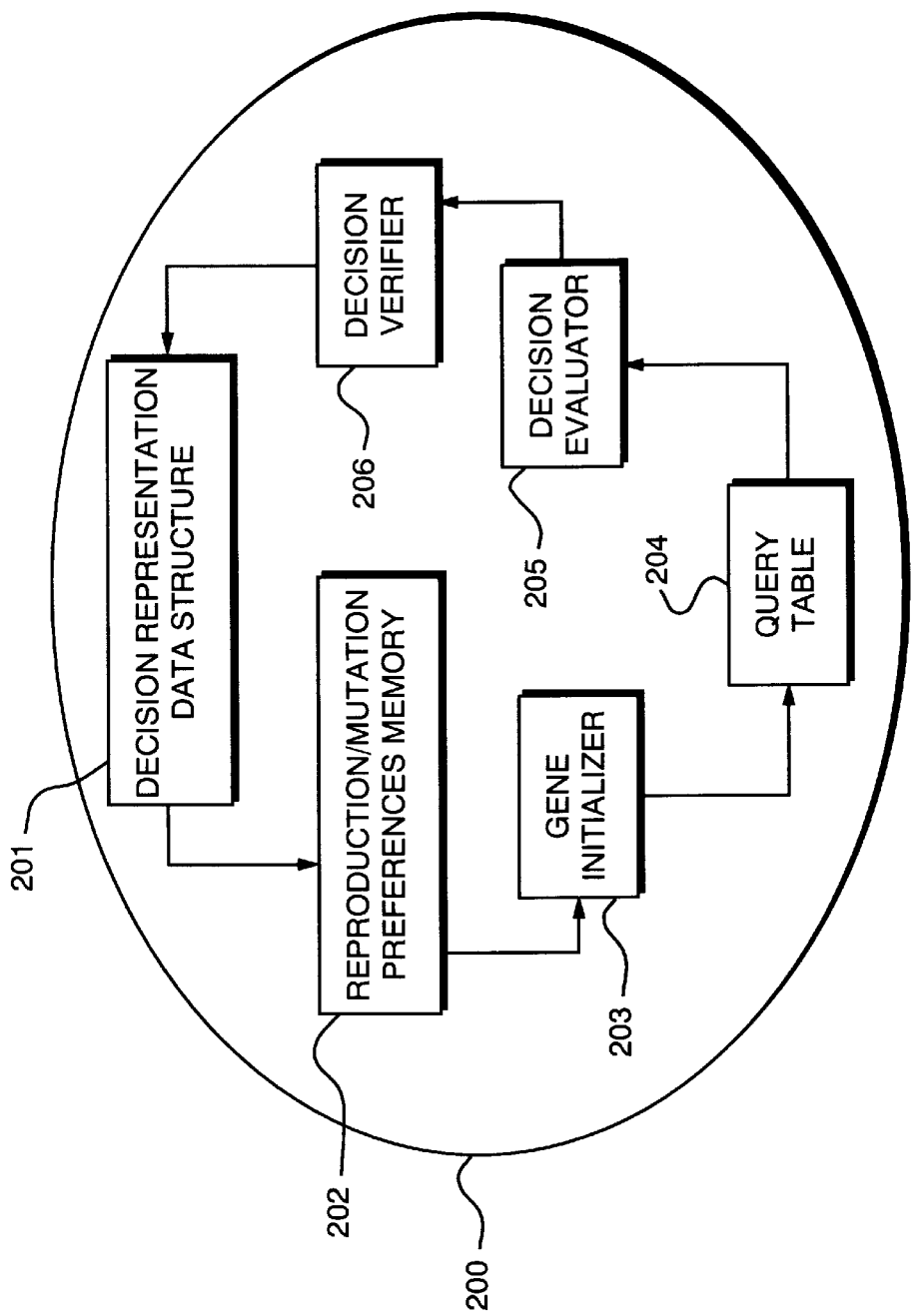
FIG. 4A is a block diagram of the evolutionary intelligent agents processing cycle.
Figure 4B:
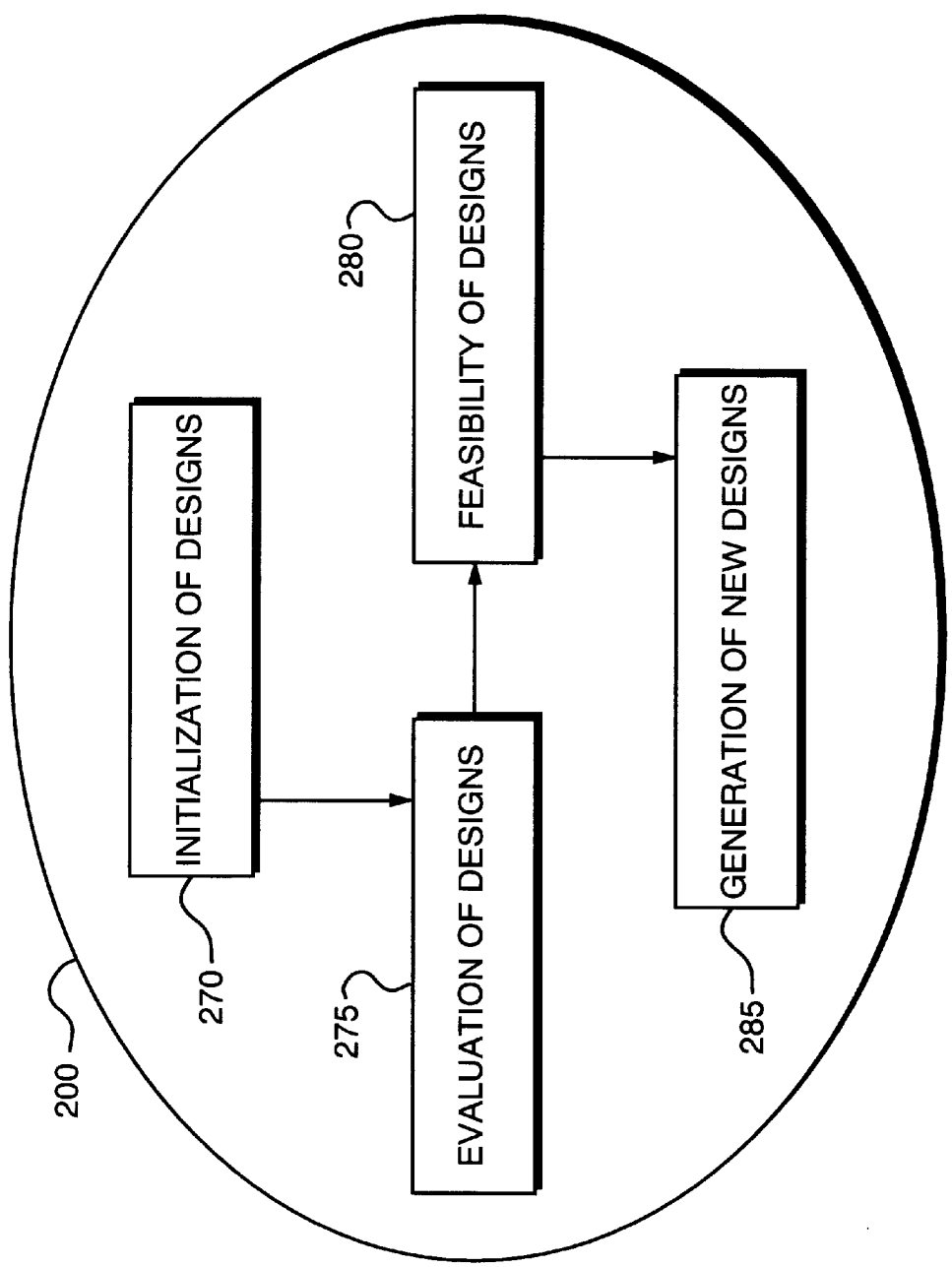
FIG. 4B is a block diagram of the functions of the evolutionary intelligent agent.

Two models for the EIA 200 are shown in FIGS. 4A and 4B. FIG. 4A shows a processing step model, while FIG. 4B more generally shows the functions performed by the EIA 200.

In FIG. 4A, the cyclic nature of the EIA 200 processing is seen. Typically, the processing will start with a decision representation data structure 201 for a design which is then compared to reproduction/mutation preferences 202 stored in a memory. Based on the comparison, a gene initializer 203 proposes changes which are formulated and generate queries 204. The queries 204 are answered by MSA 250. The results of the queries are then evaluated at a decision evaluator 205, followed by a decision verifier 206. The process can then repeat, if necessary.

FIG. 4B graphically shows the functions of the EIA 200 in the virtual design module 10. The EIA 200 is used to initialize designs 270, evaluate the designs 275, analyze the designs' feasibility 280, and finally, generate new designs 285. The EIA 200 accomplishes this task by controlling the formation of queries and activation of MSA 250 to obtain results from the distributed network over the software bus 100.

Figure 5:
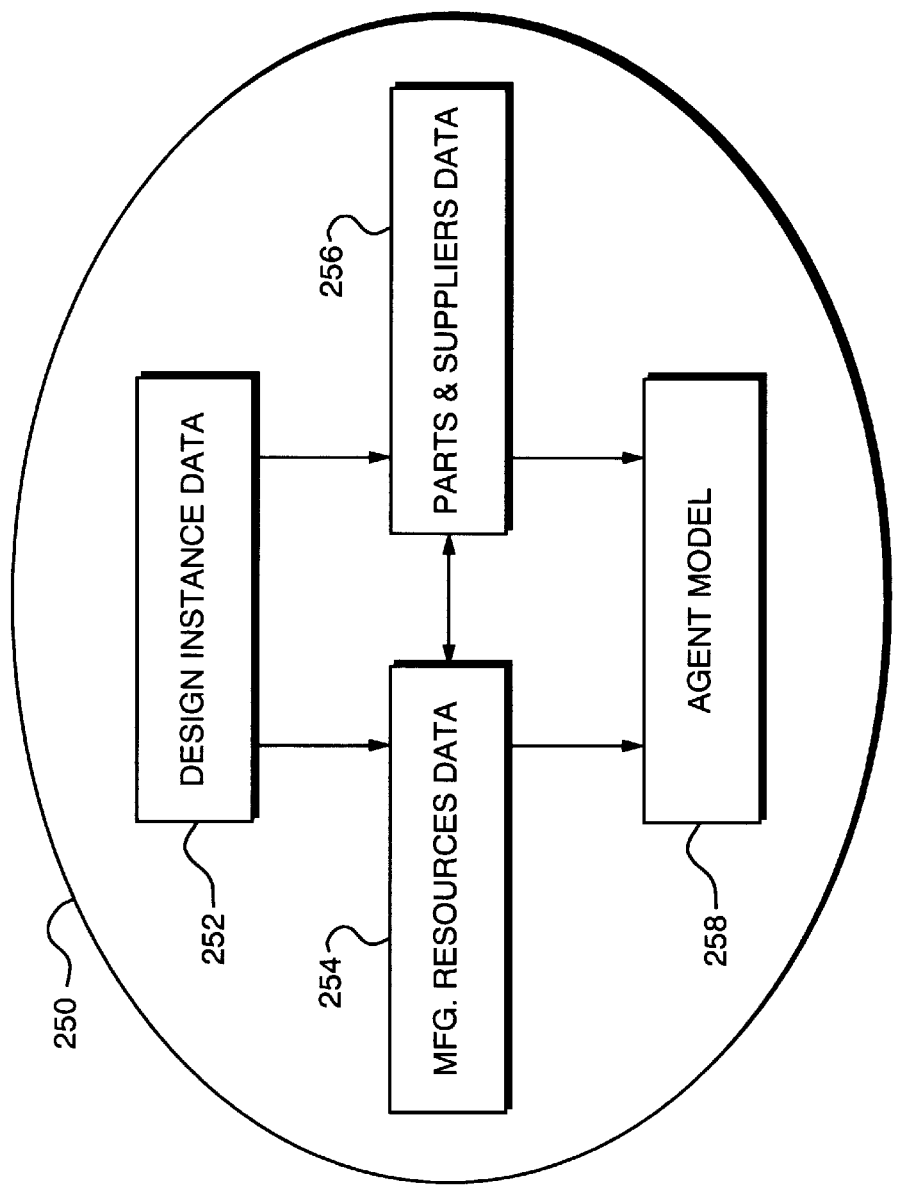
FIG. 5 is a block diagram of the functions of a mobile software agent.

The mobile software agents (MSA) 250 have a structure as shown in FIG. 5. Initially, design instance data 252 is received from the EIA 200 describing the query which the MSA 250 is to process. The MSA 250 then searches across the software bus 100 for the different supplier database objects 80 to find manufacturing resources data 254 and parts & supplier data 256 relevant to the query. The data 254, 256 are combined into an agent model 258 that is delivered back to the EIA 200 in response to the query.

Figure 6:
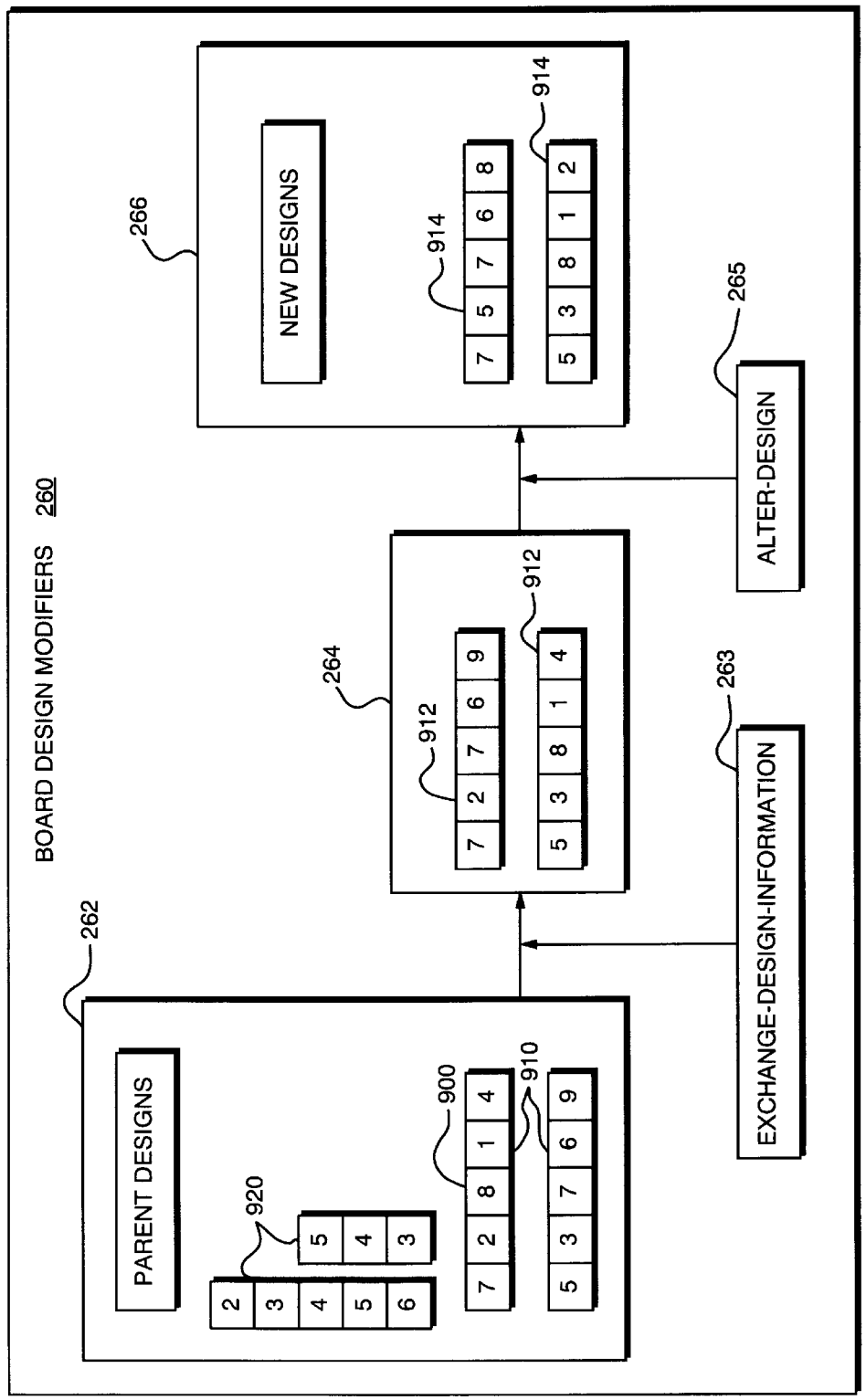
FIG. 6 is a block diagram showing the generation of new designs from existing designs.

One method of displaying and manipulating a virtual design in a coded form is shown in FIG. 6. Each virtual design can be represented as an array of integers, or genome 900, having several array slots, or genes 910. Each gene is represented by one of the array of integers and can have one of several states, or alleles, that are predetermined for that gene. The different possible alleles are called gene allele sets 920. In the case of a virtual design, the integers represent combinations of types of parts, manufacturers and suppliers which can be used for a particular design.

The genome form of representation, as shown in FIG. 6, can be used by the design modifiers 260 to create new product designs 266 which are then evaluated by the evolutionary intelligent agent 200. Initially, parent designs 262 of genomes 900 representing the product are selected for modification. Preferably, more promising product designs are selected as the parent designs 262. Design information between the parent designs 262 is exchanged using a design exchange modifier 263 to produce intermediate designs 264. The intermediate designs 264 share aspects of each of the prior parent designs 262. Then, an alter design modifier 265 is applied to randomly select different alleles for genes 912 from their gene allele sets and replace the genes 912 with new genes 914 to generate new designs 266.

An example of how the virtual design module 10 uses a genetic algorithm to generate many designs rapidly using the structure described above follows.

EXAMPLE

Let $D=\{D_1, D_2, D_3, \ldots, D_d\}$ be a set of alternate designs that achieve a predetermined functional specification. Each design $D_i$ consists of a non-empty subset of parts from the set of available parts $P=P_1, P_2, P_3, \ldots, P_p$. The electrical parts that belong to this set can be classified into categories based on their package types. Let $S=S_1, S_2, S_3 \ldots S_s$ be the set of parts suppliers. Each part in P can be supplied by one or more suppliers in S at a certain cost and at a certain lead time to delivery. We define p×s matrices $A=a_{ij}$, $C=c_{ij}$, and $T=t_{ij}$ which respectively are the availability, supply cost and supply lead time matrices. An element $a_{ij}=1$ when part $P_i$ is available from supplier $S_j$. Otherwise $a_{ij}=0$. When $a_{ij}=1$, $P_i$ is available at a cost $c_{ij}$ and with a supply lead time of $t_{ij}$ from supplier $S_j$. If we assign a supplier to supply a specific part in a design and do this for every part in that design, we can compute the total cost of parts in that design, given by $C_p$, and the maximum procurement time of the parts in that design, given by $T_p$.

Let $M=M_1, M_2, M_3, \ldots, M_m$ be the set of manufacturing lines that can assemble the various designs that realize a functional specification. Each manufacturing line $M_j$ has a fixed non-zero operational cost per hour. This cost includes the operational overhead of the factory that houses this specific manufacturing line. We then define a function $f_{mfc}:M\to\Re^+$ that models the manufacturing fixed cost. Each manufacturing line also has a variable cost per hour which is dependent on the characteristics of a particular design that is to be manufactured.

Let $$f_{pc}:D\to X \text{ where } X=[0,1]\subset\Re, \text{ and } f_{aty}:D\to Y$$

where, $Y=\{0,1\}$ denote functions related to part package types. We now define an index called the manufacturing difficulty that models the difficulty of manufacturing a specific design in a particular manufacturing line. This manufacturing difficulty index for a particular design and manufacturing line is dependent on the type of core components and the package type of the auxiliary components in a design, and is represented by the function $f_{md}^{M_j}:X\times Y\to Z$ where $Z=(0,1)\subset\Re^+$.

We model the manufacturing variable cost for a manufacturing line $M_j$ as a function $f_{mvc}^{M_j}:Z\to\Re^+$. The total manufacturing cost per hour for a design $D_i$ manufactured at manufacturing line $M_j$ is given below.

We now model the time to manufacture a particular design that implements a functional specification. We define a function $f_{ts}^{M_j}:Z\to\Re^+$ that models the setup time for a particular manufacturing line $M_j$ that is assigned to manufacture a design Do. We define a function $f_{td}:X\to\Re^+$ that models the design time overhead for a particular design $D_i$. This design time overhead typically includes the time for validation and verification of a design, and the time required to generate the layout of the bare printed circuit board that will accommodate the constituent parts. We now model the throughput on a particular manufacturing line $M_j$, as a function of the type and number of auxiliary components in a design. We define the throughput as a function $f_{tr}^{M_j}:D\to\Re^+$.

The total delay time of a design $D_i$ that has been assigned suppliers to each of its constituent parts, and is to be manufactured at manufacturing line $M_j$ is given below:

$$T_{ij}^T=f(f_{ts}^{M_j}(f_{md}^{M_j}(f_{pc}(D_i),f_{aty}(D_i))),f_{td}(f_{pc}(D_i)),t_p)$$

The total cost of a design D. that has been assigned to manufacturing line $M_j$ is:

$$C_{ij}^T=f(C_{M_{ij}},f_{tr}^{M_j},C_P)$$

The overall evaluation function minimized in our proof-of-concept implementation is a heuristic weighting of the total cost and an exponential function of the total time:

$$J_{ij}=f(C_{ij}^T,T_{ij}^T)$$

This evaluation function specifies one relationship between the direct cost of production and the indirect cost of reduced throughput and delay. In practice, this function would be customized to fit the production objectives of a particular company, product and industry sector.

This function can then be evaluated for each design using the EIA 200 in the virtual design module 10 to generate queries and activate MSA 250 to obtain the information necessary to resolve the function and produce results which can be evaluated. The EIA 200 can then optimize the designs based on the near real-time data received from the MSA 250 and return the results to a user of the virtual design module 10 via the GUI 5.

While a specific embodiment of the invention has been shown and described in detail to illustrate the application of the principles of the invention, it will be understood that the invention may be embodied otherwise without departing from such principles.

What is claimed is:

1. A virtual design module for a computer having a graphical user interface connected to a distributed network by a software bus, the module comprising:
   client services means for establishing communications with remotely located database modules across the software bus;
   module services means for controlling communications with the remotely located database modules across the software bus;
   at least one virtual design object comprising:
   agent means for generating a product design, generating queries for the remotely located database modules to obtain real-time manufacturing resource data and parts and supplier data for each component of the product design, and evaluating the manufacturing resource data and parts and supplier data in near real-time and using a genetic algorithm to produce an optimized product design based on a pre-determined set of optimization rules; and
   display means for displaying the optimized product design to a user on the graphical user interface.

2. A computer implemented method on a distributed network computer system for producing an optimized product design, the method comprising:
   generating initial product designs;
   using a software intelligent agent to generate queries about manufacturing resources and parts and supplier information for each component used in the initial product designs;
   activating mobile software agents to retrieve manufacturing resources data and parts and supplier data from remotely located databases connected to the distributed network computer system via a software bus in response to the queries;
   evaluating each product design using data retrieved by the mobile software agents and a genetic algorithm to optimize each product design based on a predetermined set of rules;
   displaying optimized product designs on a graphical user interface.

3. A method according to claim 2, further comprising generating new product designs existing product designs, and repeating using the software intelligent agent, activating mobile software agents and evaluating to produce new optimized designs.

4. A method according to claim 3, wherein the activating mobile software agents and evaluating are done in near real time.

5. A method according to claim 2, wherein the activating mobile software agents and evaluating are done in near real time.

6. A distributed computer network system for producing an optimized product design, the system comprising:

a software bus;

at least one product information database containing manufacturer resources and supplier and parts data for components used in a product design connected to the software bus in a first location;

a virtual design module having client services means for establishing communications with remotely located database modules across the software bus; module services means for controlling communications with the remotely located database modules across the software bus; at least one agent means for generating an initial product design, generating queries for at least one product information database to obtain real-time manufacturing resource and parts and supplier data for each component of the initial product design, and evaluating the manufacturing resource data and parts and supplier data in near real-time and using a genetic algorithm to produce an optimized product design based on a pre-determined set of optimization rules; and display means for displaying the optimized product design to a user on the graphical user interface.

7. A system according to claim 6, wherein the agent means further comprises evolutionary means for generating new product designs by modifying the improved product design using design modifiers to produce the optimized product designs.

* * * * *